United States Patent
Wang et al.

(10) Patent No.: US 9,440,799 B1
(45) Date of Patent: Sep. 13, 2016

(54) CONVEYING APPARATUS

(71) Applicant: FINETEK Co., Ltd., New Taipei (TW)

(72) Inventors: Jen-Shun Wang, New Taipei (TW);
Chun-Hung Chen, New Taipei (TW);
Chih-Wen Wang, New Taipei (TW);
Yi-Liang Hou, New Taipei (TW);
Chao-Kai Cheng, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 0 days.

(21) Appl. No.: 15/170,513

(22) Filed: Jun. 1, 2016

(51) Int. Cl.
| | |
|---|---|
| *B65G 43/08* | (2006.01) |
| *G06F 7/00* | (2006.01) |
| *B65G 43/02* | (2006.01) |
| *H04Q 9/00* | (2006.01) |
| *G08C 17/02* | (2006.01) |
| *G08B 21/18* | (2006.01) |
| *G08B 25/10* | (2006.01) |

(52) U.S. Cl.
CPC ............. *B65G 43/02* (2013.01); *G08B 21/187* (2013.01); *G08B 25/10* (2013.01); *G08C 17/02* (2013.01); *H04Q 9/00* (2013.01); *H04Q 2209/40* (2013.01); *H04Q 2209/823* (2013.01)

(58) Field of Classification Search
CPC ................................. B65G 43/08; G06F 7/00
USPC ................... 700/229, 230; 198/502.1, 502.3
See application file for complete search history.

(56) References Cited

U.S. PATENT DOCUMENTS

| | | | | |
|---|---|---|---|---|
| 6,370,447 B1* | 4/2002 | Miyazaki | ............... | B65G 47/54 198/349.8 |
| 7,212,884 B2* | 5/2007 | Kappelgaard | ........ | B65G 17/345 198/349 |
| 7,264,109 B2* | 9/2007 | Raque | .................... | B65G 43/10 198/460.1 |
| 7,274,971 B2* | 9/2007 | Brill | .................... | G05B 19/4189 198/810.01 |
| 7,280,889 B2* | 10/2007 | Knepple | ................. | B65G 37/02 198/460.1 |
| 7,801,641 B2* | 9/2010 | Yoshikawa | ............. | B65G 37/02 414/222.01 |
| 8,019,466 B2* | 9/2011 | Ewing | .................. | G01N 33/227 700/225 |
| 8,061,506 B2* | 11/2011 | Schafer | .................. | B65G 43/08 198/444 |

(Continued)

*Primary Examiner* — Douglas Hess
(74) *Attorney, Agent, or Firm* — Chun-Ming Shih; HDLS IPR Services

(57) ABSTRACT

A conveying apparatus (10) includes a dynamic axis (20), an idler axis (30), a conveying belt (40), a work-energy conversion wireless monitoring apparatus (50) and at least an on-site wireless controller (60). The on-site wireless controller (60) is used to sense an operation status of the conveying apparatus (10) to generate a sense data (622) and to wirelessly send the sense data (622) to the work-energy conversion wireless monitoring apparatus (50). The work-energy conversion wireless monitoring apparatus (50) includes an electric generator (502), a battery (504), a rotating speed measuring sensor (506), a microprocessor (508) and a transmission antenna (510). The electric generator (502) is coupled to and connected to the idler axis (30). The electric generator (502) is driven with a rotating motion of the idler axis (30) to generate an electricity power. The battery (504) is electrically connected to the electric generator (502).

10 Claims, 3 Drawing Sheets

(56) References Cited

U.S. PATENT DOCUMENTS

| | | | | |
|---|---|---|---|---|
| 8,201,681 B2* | 6/2012 | Schiesser | B65G 43/08 198/460.1 |
| 8,245,834 B2* | 8/2012 | Okubo | G06Q 10/047 198/349 |
| 8,417,363 B2* | 4/2013 | Erlandsson-Warvelin | B25J 9/1694 700/20 |
| 8,550,234 B2* | 10/2013 | Breen | B65G 43/10 198/460.1 |
| 8,604,776 B2* | 12/2013 | Lynn | G01M 13/023 324/160 |
| 8,655,484 B2* | 2/2014 | Stoll | B65G 43/10 700/213 |
| 8,682,484 B2* | 3/2014 | Bellante | G05B 19/4182 53/474 |
| 8,757,363 B2* | 6/2014 | Combs | B65G 43/10 198/349 |
| 8,805,585 B2* | 8/2014 | Nishihara | B25J 9/1697 198/339.1 |
| 8,843,232 B2* | 9/2014 | Hartmann | G05B 19/4182 700/230 |
| 9,147,326 B2* | 9/2015 | Kotula | G08B 3/10 |
| 9,207,252 B2* | 12/2015 | Hamada | B65G 43/00 |

\* cited by examiner

CONVEYING APPARATUS

BACKGROUND OF THE INVENTION

1. Field of the Invention

The present invention relates to a conveying apparatus, and especially relates to a conveying apparatus with wireless communication functions.

2. Description of the Related Art

The tensional belt is often used in the conveying apparatus in industry. The belt is longer naturally after being used for a long time. When the belt is longer than a predetermined length and the dynamic axis of the conveying apparatus rotates, the idler axis at the other side of the conveying apparatus will not rotate at the same time. If the user does not notice and adjust the location of the idler axis so that the belt is tightened and the idler axis rotates with the dynamic axis at the same time, only the dynamic axis will rotate and the belt will be rubbed at a fixed point. After some time, the belt will be heated and broken, and then the production line will be stopped. If the burning belt is in the environment with the high dust concentration, the industrial accident with the dust explosion may happen.

The bulk cargo storage environments or production processes of the cement, mining, thermal power generation and port machinery equipment use the bucket elevators and belt conveyors. The length of the belt (the system) is between several tens of meters to several tens of kilometers. The quantity of the conveyors is between several tens to several hundreds. The conveyors are arranged dispersedly at the mine or in the factory in the middle of nowhere. Usually, almost few people will walk and check, so that the auto-detection components have to be arranged to detect the statuses of the conveyors at any time and then the auto-detection components transmit signals to the central control center. If having problems, the alarms will be generated and informed to the maintenance personnel to repair. However, such related art arrangement mentioned above requires physical cables to transmit signals and power, so that the cost of the equipment and maintenance is increased.

SUMMARY OF THE INVENTION

In order to solve the above-mentioned problems, an object of the present invention is to provide a conveying apparatus with wireless communication functions.

In order to achieve the object of the present invention mentioned above, the conveying apparatus includes a dynamic axis, an idler axis, a conveying belt, a work-energy conversion wireless monitoring apparatus and at least an on-site wireless controller. The conveying belt is connected to the dynamic axis and the idler axis. The work-energy conversion wireless monitoring apparatus is coupled to the idler axis. The on-site wireless controller is wirelessly electrically connected to the work-energy conversion wireless monitoring apparatus. The on-site wireless controller is used to sense an operation status of the conveying apparatus to generate a sense data and to wirelessly send the sense data to the work-energy conversion wireless monitoring apparatus. The work-energy conversion wireless monitoring apparatus includes an electric generator, a battery, a rotating speed measuring sensor, a microprocessor and a transmission antenna. The electric generator is coupled to and connected to the idler axis. The electric generator is driven with a rotating motion of the idler axis to generate an electricity power. The battery is electrically connected to the electric generator. The battery receives and stores the electricity power generated by the electric generator. The rotating speed measuring sensor is electrically connected to the electric generator and the battery. The rotating speed measuring sensor measures a rotating speed of the idler axis. The microprocessor is electrically connected to the rotating speed measuring sensor and the battery. The transmission antenna is electrically connected to the microprocessor.

Moreover, the on-site wireless controller comprises a control unit, a signal output unit, a battery unit and a digital analog trigger unit. The signal output unit is electrically connected to the control unit. The battery unit is electrically connected to the control unit. The digital analog trigger unit is electrically connected to the control unit. When the digital analog trigger unit generates an abnormal trigger signal and sends the abnormal trigger signal to the control unit, the control unit utilizes the signal output unit to send the abnormal trigger signal to the work-energy conversion wireless monitoring apparatus.

Moreover, the on-site wireless controller further comprises a high-frequency-signal processing unit electrically connected to the signal output unit. The high-frequency-signal processing unit converts signals outputted from the signal output unit into high-frequency signals.

Moreover, the work-energy conversion wireless monitoring apparatus further comprises a receiving-high-frequency-signal processing unit and an outputting-high-frequency-signal processing unit. The receiving-high-frequency-signal processing unit is electrically connected to the microprocessor and the transmission antenna. The outputting-high-frequency-signal processing unit is electrically connected to the microprocessor and the transmission antenna. The receiving-high-frequency-signal processing unit receives the sense data and the abnormal trigger signal wirelessly transmitted by the on-site wireless controller, and then the receiving-high-frequency-signal processing unit sends the sense data and the abnormal trigger signal to the microprocessor. After the microprocessor operational processes the sense data and the abnormal trigger signal, the microprocessor utilizes the outputting-high-frequency-signal processing unit to inform outside.

Moreover, the conveying apparatus further comprises at least a gateway electrically connected to or wirelessly electrically connected to the on-site wireless controller. The gateway and the on-site wireless controller proceed with a data transmission. The gateway comprises a memory apparatus to process memory recovery settings.

Moreover, the work-energy conversion wireless monitoring apparatus further comprises a display unit electrically connected to the microprocessor and the battery.

Moreover, the microprocessor comprises a memory unit.

Moreover, the conveying apparatus further comprises a stopping-conveying-apparatus-operation switch electrically connected to the dynamic axis.

Moreover, an electric power source of the on-site wireless controller is a solar energy or a vibrational energy.

Moreover, the work-energy conversion wireless monitoring apparatus and the on-site wireless controller wirelessly transmit data to a central control center directly.

The advantages and technical features of the present invention comprise:

1. The on-site wireless controllers are connected by utilizing high frequency signals and are connected to the work-energy conversion wireless monitoring apparatus for an effective monitoring management. The gateway comprises the memory apparatus to process the memory recovery settings.

2. The work-energy conversion is achieved by utilizing the motivation power of the conveying system itself to supply power for receiving and transmitting wireless signals and for the work-energy conversion wireless monitoring apparatus.

3. The related art on-site control system is a concatenated type control system. If one of the apparatuses is broken, the whole conveying apparatus is shutdown. The present invention utilizes the on-site wireless controllers and the gateway, so that if one of the apparatuses is broken, according to the wireless signal repeating transmission, the conveying system can still work normally.

DETAILED DESCRIPTION OF THE INVENTION

Please refer to following detailed description and figures for the technical content of the present invention. The following detailed description and figures are referred for the present invention, but the present invention is not limited to it.

Figure 1:
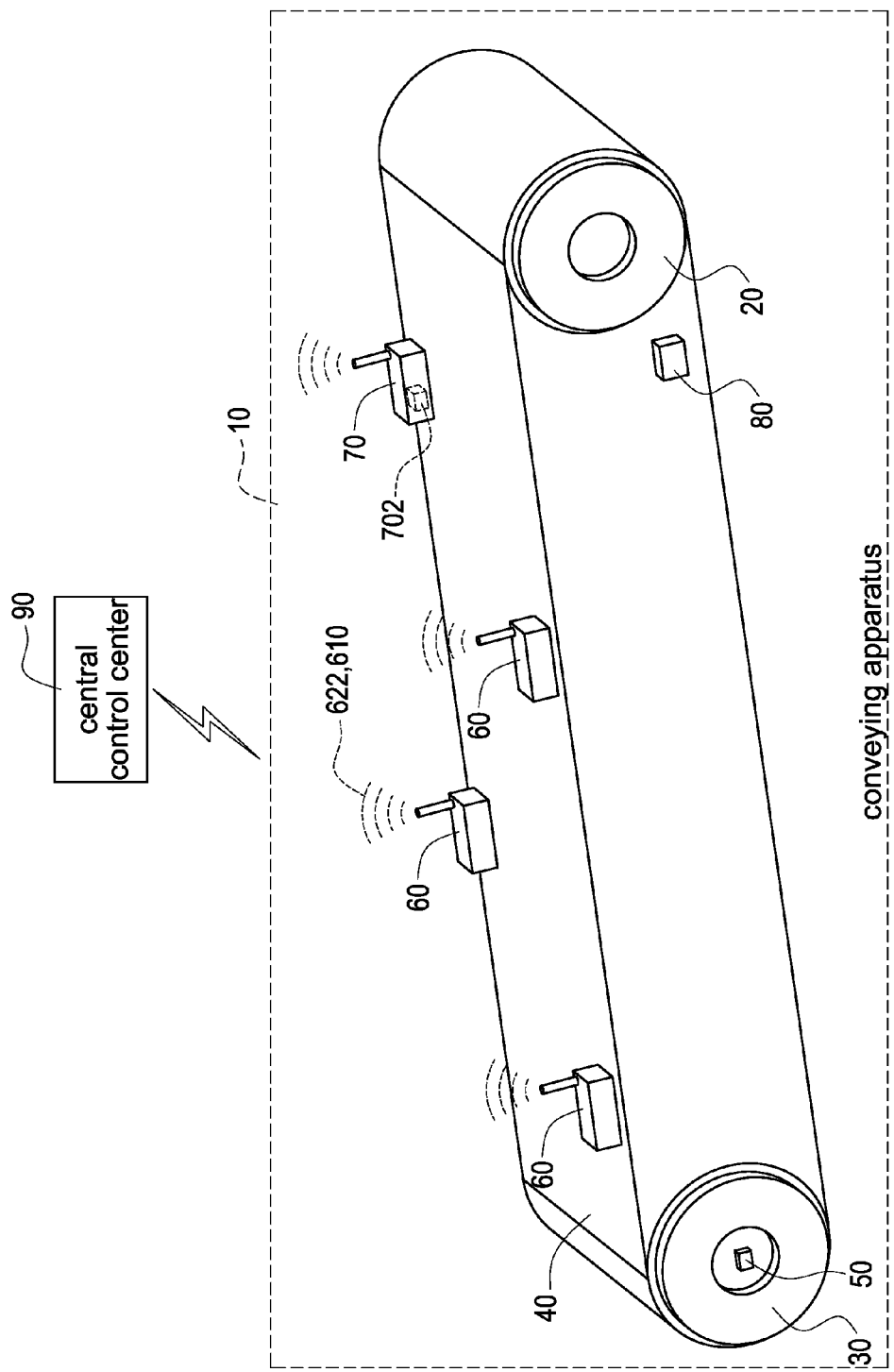
FIG. 1 shows a schematic diagram of the conveying apparatus of the present invention.

FIG. 1 shows a schematic diagram of the conveying apparatus of the present invention. The conveying apparatus 10 of the present invention includes a dynamic axis 20, an idler axis 30, a conveying belt 40, a work-energy conversion wireless monitoring apparatus 50, at least an on-site wireless controller 60, at least a gateway 70 and a stopping-conveying-apparatus-operation switch 80.

The conveying belt 40 is connected to the dynamic axis 20 and the idler axis 30, so that when the dynamic axis 20 rotates, the dynamic axis 20 drives the idler axis 30 through the conveying belt 40. The work-energy conversion wireless monitoring apparatus 50 is coupled to the idler axis 30. The on-site wireless controller 60 is wirelessly electrically connected to the work-energy conversion wireless monitoring apparatus 50. The on-site wireless controller 60 is used to sense an operation status of the conveying apparatus 10 to generate a sense data 622 and to wirelessly send the sense data 622 to the work-energy conversion wireless monitoring apparatus 50. The work-energy conversion wireless monitoring apparatus 50 and the on-site wireless controller 60 can, for example but not limited to, wirelessly transmit data to a central control center 90 directly for the further processing.

The gateway 70 is electrically connected to or wirelessly electrically connected to the on-site wireless controller 60. The gateway 70 and the on-site wireless controller 60 proceed with a data transmission. The gateway 70 comprises a memory apparatus 702 to process memory recovery settings. The gateway 70 is used to connect wireless transmissions of the belt combinations. The stopping-conveying-apparatus-operation switch 80 is electrically connected to the dynamic axis 20.

Figure 2:
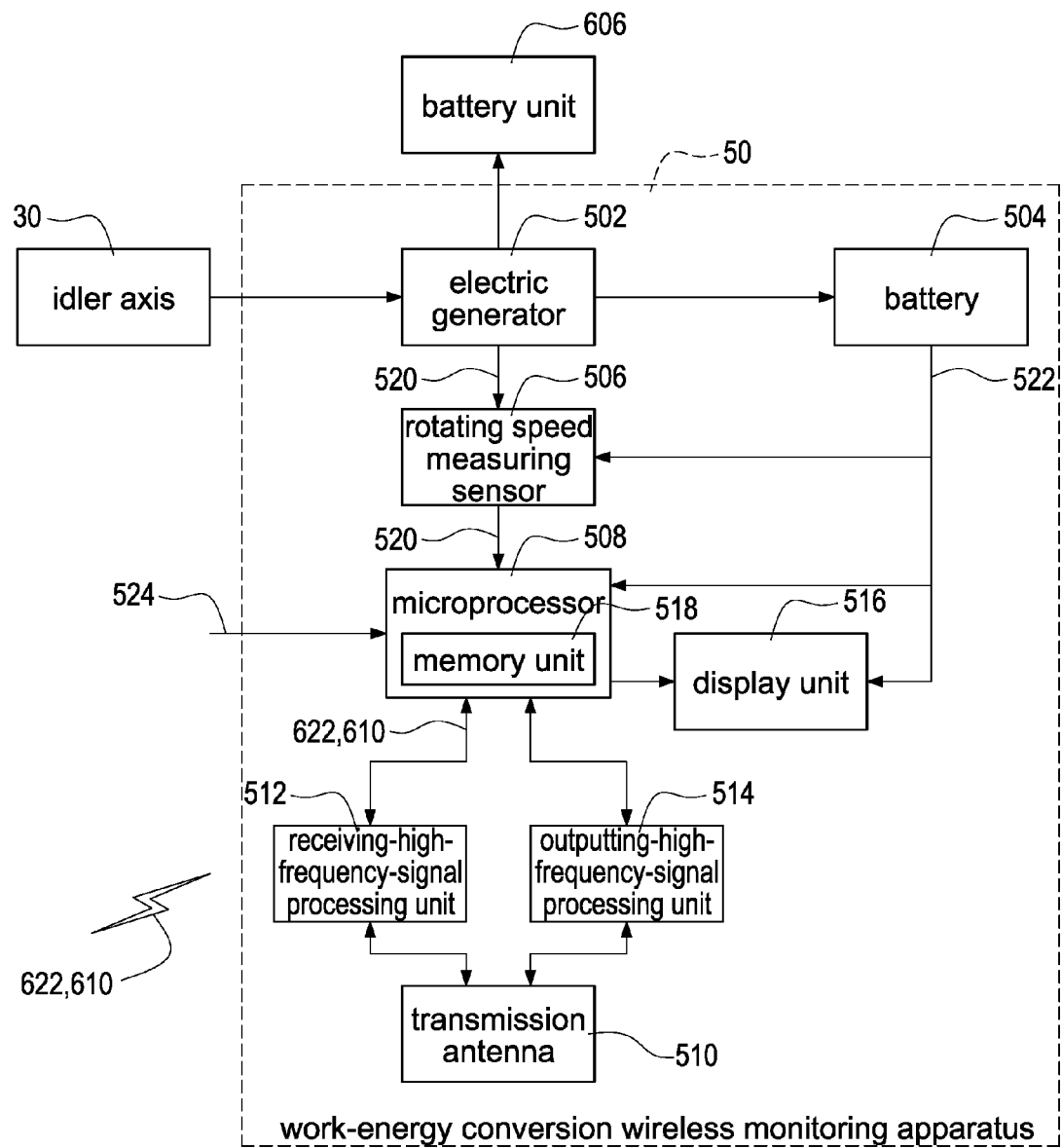
FIG. 2 shows a block diagram of the work-energy conversion wireless monitoring apparatus of the present invention.

FIG. 2 shows a block diagram of the work-energy conversion wireless monitoring apparatus of the present invention. Please refer to FIG. 1 at the same time. The work-energy conversion wireless monitoring apparatus 50 includes an electric generator 502, a battery 504, a rotating speed measuring sensor 506, a microprocessor 508, a transmission antenna 510, a receiving-high-frequency-signal processing unit 512, an outputting-high-frequency-signal processing unit 514 and a display unit 516. The microprocessor 508 includes a memory unit 518. The electric generator 502 can supply power to a battery unit 606.

The electric generator 50 is coupled to and connected to (namely, mechanically coupled to) the idler axis 30, so that the electric generator 502 is driven with a rotating motion of the idler axis 30 to generate an electricity power. The battery 504 is electrically connected to the electric generator 502. The battery 504 receives and stores the electricity power generated by the electric generator 502. The battery 504 sends a working power 522 to the rotating speed measuring sensor 506, the microprocessor 508 and the display unit 516 to drive the rotating speed measuring sensor 506, the microprocessor 508 and the display unit 516. The rotating speed measuring sensor 506 is electrically connected to the electric generator 502 and the battery 504. The rotating speed measuring sensor 506 measures a rotating speed of the idler axis 30 through the electric generator 502 to generate a rotating speed characteristic signal 520. The rotating speed measuring sensor 506 obtains the rotating speed characteristic signal 520 from the electric generator 502. The rotating speed measuring sensor 506 sends the rotating speed characteristic signal 520 to the microprocessor 508 for the further processing. The microprocessor 508 is electrically connected to the rotating speed measuring sensor 506 and the battery 504. The microprocessor 508 receives an analog/digital signal 524 (for examples, a temperature signal, a weight signal or a caution signal etc.)

The transmission antenna 510 is electrically connected to the microprocessor 508 through the receiving-high-frequency-signal processing unit 512 and the outputting-high-frequency-signal processing unit 514. The receiving-high-frequency-signal processing unit 512 is electrically connected to the microprocessor 508 and the transmission antenna 510. The outputting-high-frequency-signal processing unit 514 is electrically connected to the microprocessor 508 and the transmission antenna 510. The receiving-high-frequency-signal processing unit 512 receives the sense data 622 and the abnormal trigger signal 610 wirelessly transmitted by the on-site wireless controller 60 through the transmission antenna 510, and then the receiving-high-frequency-signal processing unit 512 sends the sense data 622 and the abnormal trigger signal 610 to the microprocessor 508 for the further processing. After the microprocessor 508 operational processes the sense data 622 and the abnormal trigger signal 610, the microprocessor 508 utilizes the outputting-high-frequency-signal processing unit 514 and the transmission antenna 510 to inform outside (for example, to inform the central control center 90 shown in FIG. 1 for the further processing). The receiving-high-frequency-signal processing unit 512 and the outputting-high-frequency-signal processing unit 514 can be integrated as a wireless communication module, and the wireless communication module and the transmission antenna 510 use 3G, 4G, ZigBee, LoRa or WiFi technologies. The display unit 516 is electrically connected to the microprocessor 508 and the battery 504. The display unit 516 displays information transmitted by the microprocessor 508. The memory unit 518 is used to memorize data received by the microprocessor 508.

Figure 3:
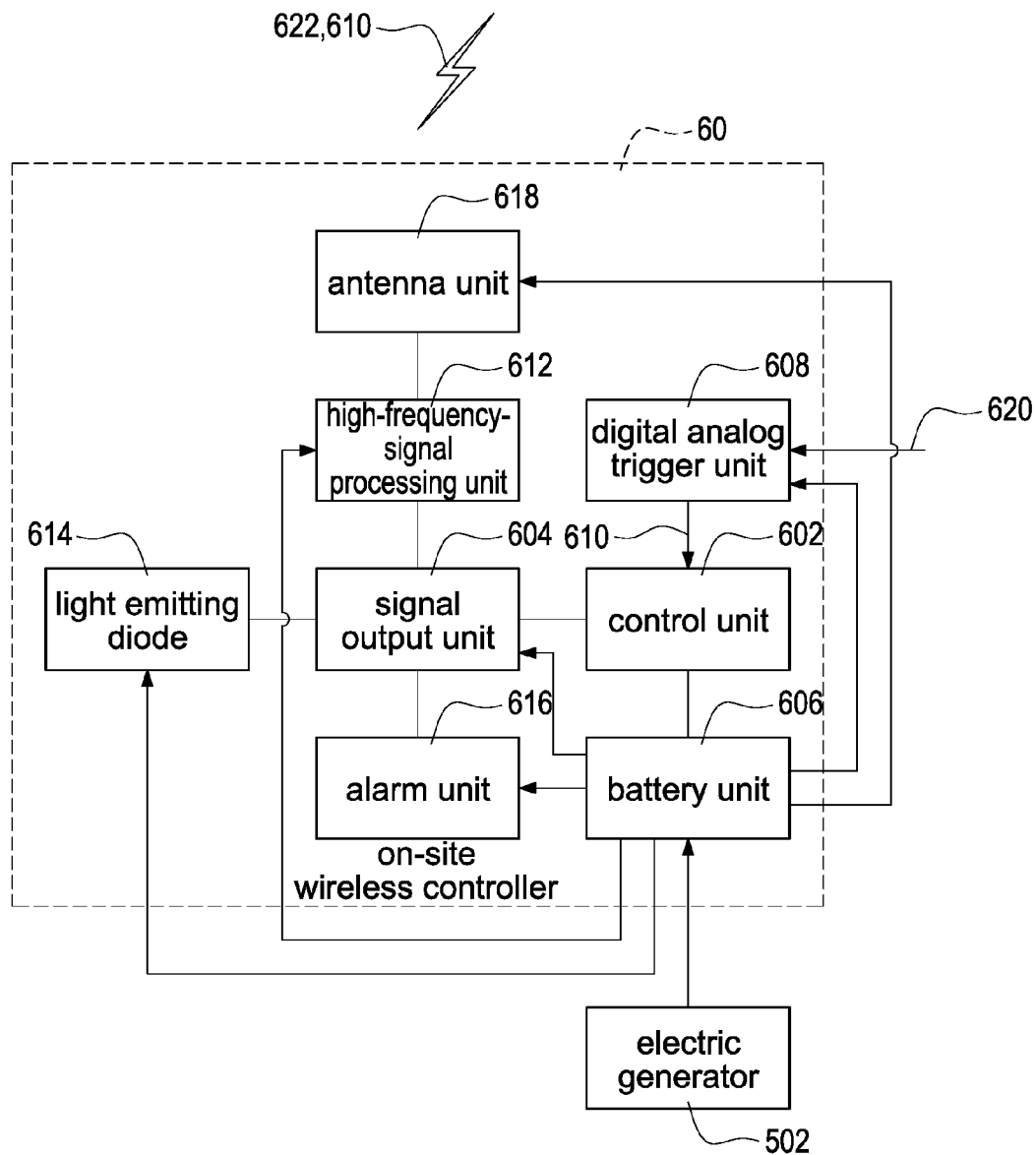
FIG. 3 shows a block diagram of the on-site wireless controller of the present invention.

FIG. 3 shows a block diagram of the on-site wireless controller of the present invention. Please refer to FIG. 1 and FIG. 2 at the same time. The on-site wireless controller 60 comprises a control unit 602, a signal output unit 604, a battery unit 606, a digital analog trigger unit 608, a high-frequency-signal processing unit 612, a light emitting diode 614, an alarm unit 616 and an antenna unit 618.

The signal output unit 604 is electrically connected to the control unit 602. The battery unit 606 is electrically connected to the control unit 602 and the electric generator 502. The digital analog trigger unit 608 is electrically connected to the control unit 602. The digital analog trigger unit 608 is used to receive an input output trigger analog trigger signal 620. The input output trigger analog trigger signal 620 is an external input signal (for examples, a cord pulling signal or a button-off-tracking signal etc.). When the digital analog trigger unit 608 generates an abnormal trigger signal 610 and sends the abnormal trigger signal 610 to the control unit 602, the control unit 602 utilizes the signal output unit 604, the high-frequency-signal processing unit 612 and the antenna unit 618 to send the abnormal trigger signal 610 to the work-energy conversion wireless monitoring apparatus 50.

The high-frequency-signal processing unit 612 is electrically connected to the signal output unit 604. The high-frequency-signal processing unit 612 is used to convert signals (namely, the abnormal trigger signal 610 and the sense data 622) outputted from the signal output unit 604 into high-frequency signals. The light emitting diode 614 is electrically connected to the signal output unit 604. The alarm unit 616 is electrically connected to the signal output unit 604. The antenna unit 618 is electrically connected to the high-frequency-signal processing unit 612. An electric power source of the on-site wireless controller 60 can be the battery unit 606, a solar energy or a vibrational energy.

The battery unit 606 is electrically connected to the control unit 602, the signal output unit 604, the digital analog trigger unit 608, the high-frequency-signal processing unit 612, the light emitting diode 614, the alarm unit 616 and the antenna unit 618 to supply power to the control unit 602, the signal output unit 604, the digital analog trigger unit 608, the high-frequency-signal processing unit 612, the light emitting diode 614, the alarm unit 616 and the antenna unit 618.

Please refer to FIG. 1, FIG. 2 and FIG. 3 again. The electric generator 502 of the work-energy conversion wireless monitoring apparatus 50 is coupled to and connected to the idler axis 30 to generate the electricity power, and then the electricity power is stored to supply power to the monitoring module and the wireless module. The on-site wireless controllers 60 utilize the electricity power mentioned above or power from the battery or the solar energy. The on-site wireless controllers 60 transmit related information to the work-energy conversion wireless monitoring apparatus 50 by the high frequency or wireless signal. The conveying apparatus 10 comprises a plurality of the on-site wireless controllers 60. The on-site wireless controllers 60 are, for example but not limited to, vibrational alarms, off-tracking alarms, cord pulling alarms, on-site button alarms or temperature alarms. The present invention achieves low construction and maintenance cost by the high frequency or wireless technology. The present invention has the advantage that the related alarm information can be transmitted quickly.

In conclusion, the present invention provides an on-site wireless control system comprising wireless networks, and the advantages and technical features of the present invention comprise:

1. The on-site wireless controllers 60 are connected by utilizing high frequency signals and are connected to the work-energy conversion wireless monitoring apparatus 50 for an effective monitoring management. The gateway 70 comprises the memory apparatus 702 to process the memory recovery settings.

2. The work-energy conversion is achieved by utilizing the motivation power of the conveying system itself to supply power for receiving and transmitting wireless signals and for the work-energy conversion wireless monitoring apparatus 50.

3. The related art on-site control system is a concatenated type control system. If one of the apparatuses is broken, the whole conveying apparatus is shutdown. The present invention utilizes the on-site wireless controllers 60 and the gateway 70, so that if one of the apparatuses is broken, according to the wireless signal repeating transmission, the conveying system can still work normally.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A conveying apparatus (10) comprising:
a dynamic axis (20);
an idler axis (30);
a conveying belt (40) connected to the dynamic axis (20) and the idler axis (30);
a work-energy conversion wireless monitoring apparatus (50) coupled to the idler axis (30); and
at least an on-site wireless controller (60) wirelessly electrically connected to the work-energy conversion wireless monitoring apparatus (50), the on-site wireless controller (60) sensing an operation status of the conveying apparatus (10) to generate a sense data (622) and to wirelessly send the sense data (622) to the work-energy conversion wireless monitoring apparatus (50),
wherein the work-energy conversion wireless monitoring apparatus (50) comprises:
an electric generator (502) coupled to and connected to the idler axis (30), the electric generator (502) driven with a rotating motion of the idler axis (30) to generate an electricity power;
a battery (504) electrically connected to the electric generator (502), the battery (504) receiving and storing the electricity power generated by the electric generator (502);
a rotating speed measuring sensor (506) electrically connected to the electric generator (502) and the battery (504), the rotating speed measuring sensor (506) measuring a rotating speed of the idler axis (30);
a microprocessor (508) electrically connected to the rotating speed measuring sensor (506) and the battery (504); and
a transmission antenna (510) electrically connected to the microprocessor (508).

2. The conveying apparatus (10) in claim 1, wherein the on-site wireless controller (60) comprises:
a control unit (602);
a signal output unit (604) electrically connected to the control unit (602);
a battery unit (606) electrically connected to the control unit (602); and a digital analog trigger unit (608) electrically connected to the control unit (602), wherein when the digital analog trigger unit (608) generates an abnormal trigger signal (610) and sends the abnormal trigger signal (610) to the control unit (602), the control unit (602) utilizes the signal output unit (604) to send the abnormal trigger signal (610) to the work-energy conversion wireless monitoring apparatus (50).

3. The conveying apparatus (10) in claim 2, wherein the on-site wireless controller (60) further comprises:

a high-frequency-signal processing unit (612) electrically connected to the signal output unit (604), the high-frequency-signal processing unit (612) converting signals outputted from the signal output unit (604) into high-frequency signals.

4. The conveying apparatus (10) in claim 3 further comprising:

at least a gateway (70) electrically connected to or wirelessly electrically connected to the on-site wireless controller (60), wherein the gateway (70) and the on-site wireless controller (60) proceed with a data transmission; the gateway (70) comprises a memory apparatus (702) to process memory recovery settings.

5. The conveying apparatus (10) in claim 2, wherein the work-energy conversion wireless monitoring apparatus (50) further comprises:

a receiving-high-frequency-signal processing unit (512) electrically connected to the microprocessor (508) and the transmission antenna (510); and an outputting-high-frequency-signal processing unit (514) electrically connected to the microprocessor (508) and the transmission antenna (510), wherein the receiving-high-frequency-signal processing unit (512) receives the sense data (622) and the abnormal trigger signal (610) wirelessly transmitted by the on-site wireless controller (60), and then the receiving-high-frequency-signal processing unit (512) sends the sense data (622) and the abnormal trigger signal (610) to the microprocessor (508); after the microprocessor (508) operational processes the sense data (622) and the abnormal trigger signal (610), the microprocessor (508) utilizes the outputting-high-frequency-signal processing unit (514) to inform outside.

6. The conveying apparatus (10) in claim 2 further comprising:

a stopping-conveying-apparatus-operation switch (80) electrically connected to the dynamic axis (20).

7. The conveying apparatus (10) in claim 2, wherein an electric power source of the on-site wireless controller (60) is a solar energy or a vibrational energy.

8. The conveying apparatus (10) in claim 1, wherein the work-energy conversion wireless monitoring apparatus (50) further comprises:

a display unit (516) electrically connected to the microprocessor (508) and the battery (504).

9. The conveying apparatus (10) in claim 1, wherein the microprocessor (508) comprises a memory unit (518).

10. The conveying apparatus (10) in claim 1, wherein the work-energy conversion wireless monitoring apparatus (50) and the on-site wireless controller (60) wirelessly transmit data to a central control center (90) directly.

* * * * *